(12) United States Patent
Miyata et al.

(10) Patent No.: US 7,002,155 B2
(45) Date of Patent: Feb. 21, 2006

(54) X-RAY IMAGING DEVICE

(75) Inventors: Emi Miyata, Toyonaka (JP); Kazuhisa Miyaguchi, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 147 days.

(21) Appl. No.: 10/771,462

(22) Filed: Feb. 5, 2004

(65) Prior Publication Data

US 2004/0155198 A1 Aug. 12, 2004

(30) Foreign Application Priority Data

Feb. 6, 2003 (JP) ............................. P2003-029945

(51) Int. Cl.
*G01T 1/24* (2006.01)
(52) U.S. Cl. ..................... 250/370.11; 250/370.08; 250/370.09
(58) Field of Classification Search ........... 250/370.11, 250/370.08, 370.09, 362, 363.01, 370.12, 250/504 R; 378/43, 37, 87
See application file for complete search history.

(56) References Cited

U.S. PATENT DOCUMENTS

| | | | |
|---|---|---|---|
| 4,641,953 A * | 2/1987 | Oushiden et al. ............ | 399/197 |
| 4,870,279 A * | 9/1989 | Cueman et al. .............. | 250/368 |
| 4,954,706 A * | 9/1990 | Takahashi et al. ........... | 250/580 |
| 5,059,800 A * | 10/1991 | Cueman et al. .............. | 250/367 |
| 5,150,394 A * | 9/1992 | Karellas ....................... | 378/62 |
| 5,259,013 A * | 11/1993 | Kuriyama et al. ............ | 378/43 |
| 6,005,911 A * | 12/1999 | Cheung ........................ | 378/37 |
| 6,031,892 A * | 2/2000 | Karellas ...................... | 378/98.3 |
| 6,285,740 B1 * | 9/2001 | Seely et al. .................. | 378/98.9 |
| 2002/0158208 A1 * | 10/2002 | Mori et al. ............ | 250/370.11 |

FOREIGN PATENT DOCUMENTS

JP 09-275223 10/1997

OTHER PUBLICATIONS

G. C. H. Sanderink, "Intra-Oral and Extra-Oral Digital Imaging: an Overview of Factors Relevant to Detector Design", *Nuclear Instruments and Methods in Physics Research*, A 509, pp. 256-261, (2003).

A. D. Holland, "New Developments in CCD and Pixel Arrays", *Nuclear Instruments and Methods in Physics Research*, A 513, pp. 308-312, (2003).

Badel, et al., "Improvement of an X-ray Imaging Detector Based on a Scintillating Guides Screeen", *Nuclear Instruments and Methods in Physics Research*, A 487, pp. 129-135, (2002).

Speller, et al., "Current Statue and Requirements for Position-Sensitive Detector in Medicine", *Nuclear Instruments and Methods in Physics Research*, A 477, pp. 469-474, (2002).

(Continued)

*Primary Examiner*—David Porta
*Assistant Examiner*—Faye Polyzos
(74) *Attorney, Agent, or Firm*—Drinker Biddle & Reath LLP

(57) ABSTRACT

The X-ray imaging device comprises an imaging portion having sensitivity to X-ray with a predetermined energy range and to visible light with a predetermined wavelength range and picking up images of X-ray and visible light and a scintillator to emit visible light with predetermined wavelength range by absorbing X-ray with a higher energy range than a predetermined energy range. The imaging portion is arranged corresponding to a surface of X-ray incidence. The scintillator is formed on an opposite surface to the surface of X-ray incidence across the imaging portion in a direction of X-ray incidence.

12 Claims, 5 Drawing Sheets

OTHER PUBLICATIONS

Bavdaz, et al., "Future Space Applications of Compound Semiconductor X-Ray Detectors", *Nuclear Instruments and Methods in Physics Research,* A 458, pp. 123-131, (2001).

Castelli, et al., "A Novel High Energy X-Ray Detector Concept using CCDs", *Nuclear Instruments and Methods in Physics Research,* A 376, pp. 298-300, (1996).

* cited by examiner

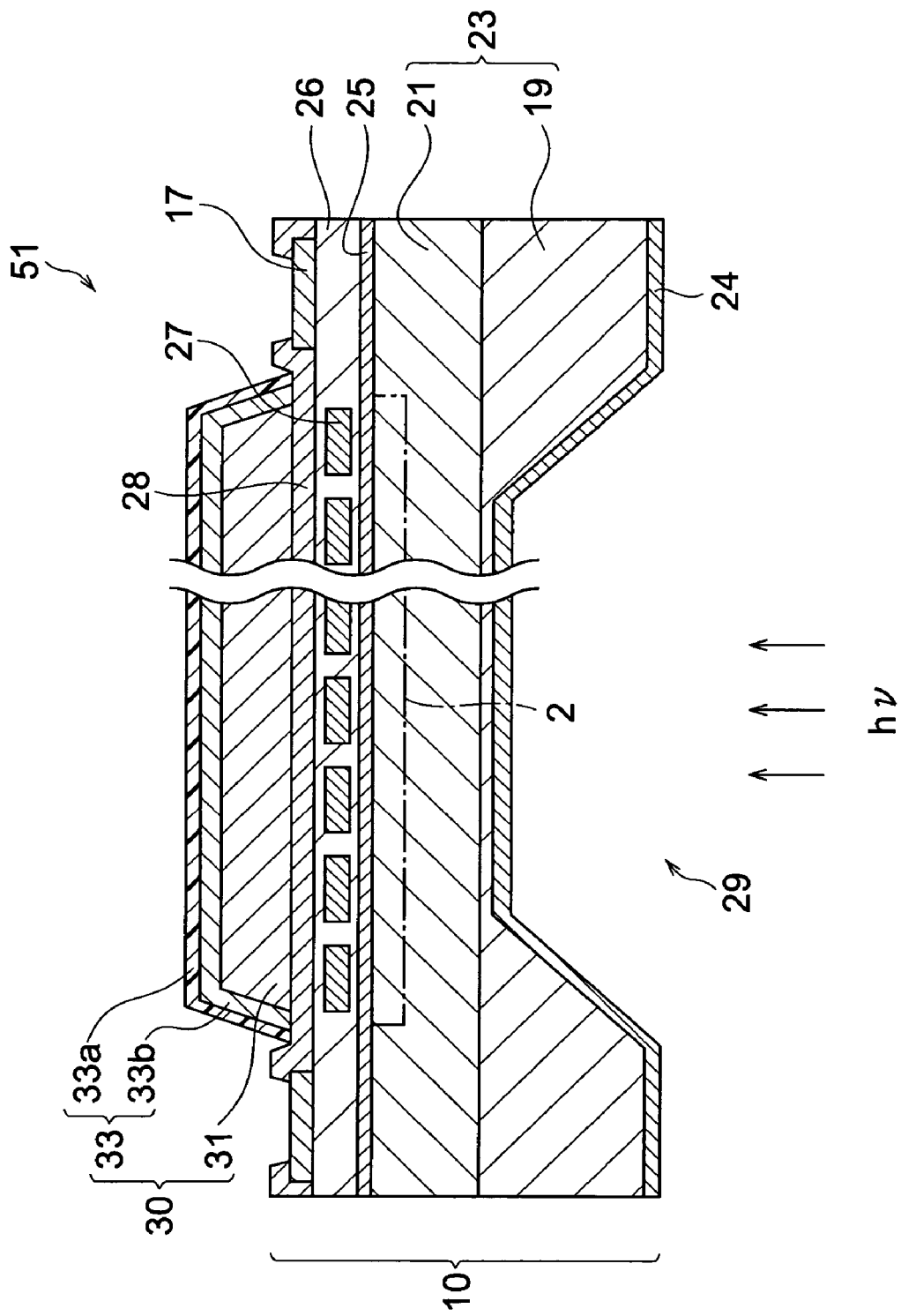

SOFT X-RAY

HARD X-RAY

X-RAY IMAGING DEVICE

BACKGROUND OF THE INVENTION

1. Field of the Invention

The present invention relates to X-ray imaging device.

2. Related Background Art

X-ray imaging device using charge-coupled device (abbreviated to "CCD" hereinafter) is an imaging device having superior energy resolution and position resolution. X-ray imaging device using back-illuminated CCD excels in low energy X-ray detection efficiency because electrodes for charge transfer do not shield X-ray to be detected. This causes the X-ray imaging device using back-illuminated CCD to detect X-ray within a predetermined energy range (for example, from 0.1 to 20 keV (called "soft X-ray" hereinafter)).

Since CCD is made from silicon (Si), absorption of X-ray with a higher energy range (for example, from 20 to 100 keV (called "hard X-ray")) than the predetermined energy range is extremely low. Consequently, hard X-ray is not detected at CCD and passes through the CCD. Therefore, in order to detect hard X-ray, it is inevitable to use X-ray imaging device provided with scintillator to convert X-ray into visible light, so that the detection of any X-ray within a wide energy range (that is, soft X-ray and hard X-ray) with one imaging device was not possible.

The radiation detector with a plurality of PIN photodiodes laminated via insulators is known, which can detect X-ray with different energy ranges using each PIN photodiode.

SUMMARY OF THE INVENTION

However, the radiation detector with a plurality of PIN photodiodes laminated is structurally complicated.

An object of the invention is to provide a structurally simple X-ray imaging device which can detect any X-ray with a wide energy range.

X-ray imaging device in accordance with the invention comprises an imaging portion arranged corresponding to a surface of X-ray incidence, having sensitivity to X-ray with a predetermined energy range and to visible light with a predetermined wavelength range and picking up images of X-ray and visible light; and a scintillator arranged on an opposite surface to the surface of X-ray incidence across the imaging portion in a direction of X-ray incidence, emitting visible light with the predetermined wavelength range by absorbing X-ray with a higher energy range than the predetermined energy range.

In the X-ray imaging device in accordance with the invention, when X-ray with a predetermined energy range is incident, image of X-ray with the predetermined energy range is picked up by the imaging portion. On the other hand, when X-ray with a higher energy range than a predetermined energy range is incident, X-ray is converted into visible light with a predetermined wavelength range via a scintillator, and image of the resultant visible light with the predetermined wavelength range is picked up by the imaging portion. As a result, image of any X-ray with a wide range up to a higher energy range than the predetermined energy range can be picked up. Further, the simple structure in which the scintillator is formed on the opposite surface to the surface of X-ray incidence across the imaging portion in the direction of X-ray incidence, so that the image of any X-ray with a wide energy range can be picked up.

Preferably, the imaging portion is formed on the opposite surface to the surface of X-ray incidence on a semiconductor substrate; and the scintillator is arranged on the opposite surface of the semiconductor substrate so as to cover at least the imaging portion.

Preferably, the imaging portion is formed on the surface of X-ray incidence on a semiconductor substrate; and the scintillator is arranged on the opposite surface to the surface of X-ray incidence on the semiconductor substrate so as to cover at least an area corresponding to the imaging portion.

The semiconductor substrate is preferably thinned at the area corresponding to the imaging potion.

The imaging portion includes preferably a plurality of imaging elements arrayed two-dimensionally.

The scintillator contains preferably $Bi_4Ge_3O_{12}$.

Alternatively, the scintillator contains preferably CsI.

More alternatively, the scintillator contains preferably $Gd_2O_2S$.

Preferably, a reflective film, which reflects visible light with a predetermined wavelength range, is provided behind the scintillator in the direction of X-ray incidence.

X-ray imaging device in accordance with the invention comprises an imaging portion formed on an opposite surface to a surface of X-ray incidence on a semiconductor substrate, having sensitivity to X-ray with a predetermined energy range and to visible light with a predetermined wavelength range and picking up images of X-ray and visible light; and a scintillator arranged on the opposite surface of the semiconductor substrate so as to cover the imaging portion, emitting visible light with the predetermined wavelength range by absorbing X-ray with a higher energy range than the predetermined energy range.

X-ray imaging device in accordance with the invention comprises an imaging portion formed on a surface of X-ray incidence on a semiconductor substrate, having sensitivity to X-ray with a predetermined energy range and to visible light with a predetermined wavelength range and picking up images of X-ray and visible light; and a scintillator arranged on an opposite surface to the surface of X-ray incidence on the semiconductor substrate so as to cover at least an area corresponding to the imaging portion, emitting visible light with the predetermined wavelength range by absorbing X-ray with a higher energy range than the predetermined energy range.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a schematic representation illustrative of a sectional structure of the X-ray imaging device in accordance with a second embodiment.

DESCRIPTION OF THE PREFERRED EMBODIMENTS

Figure 1:
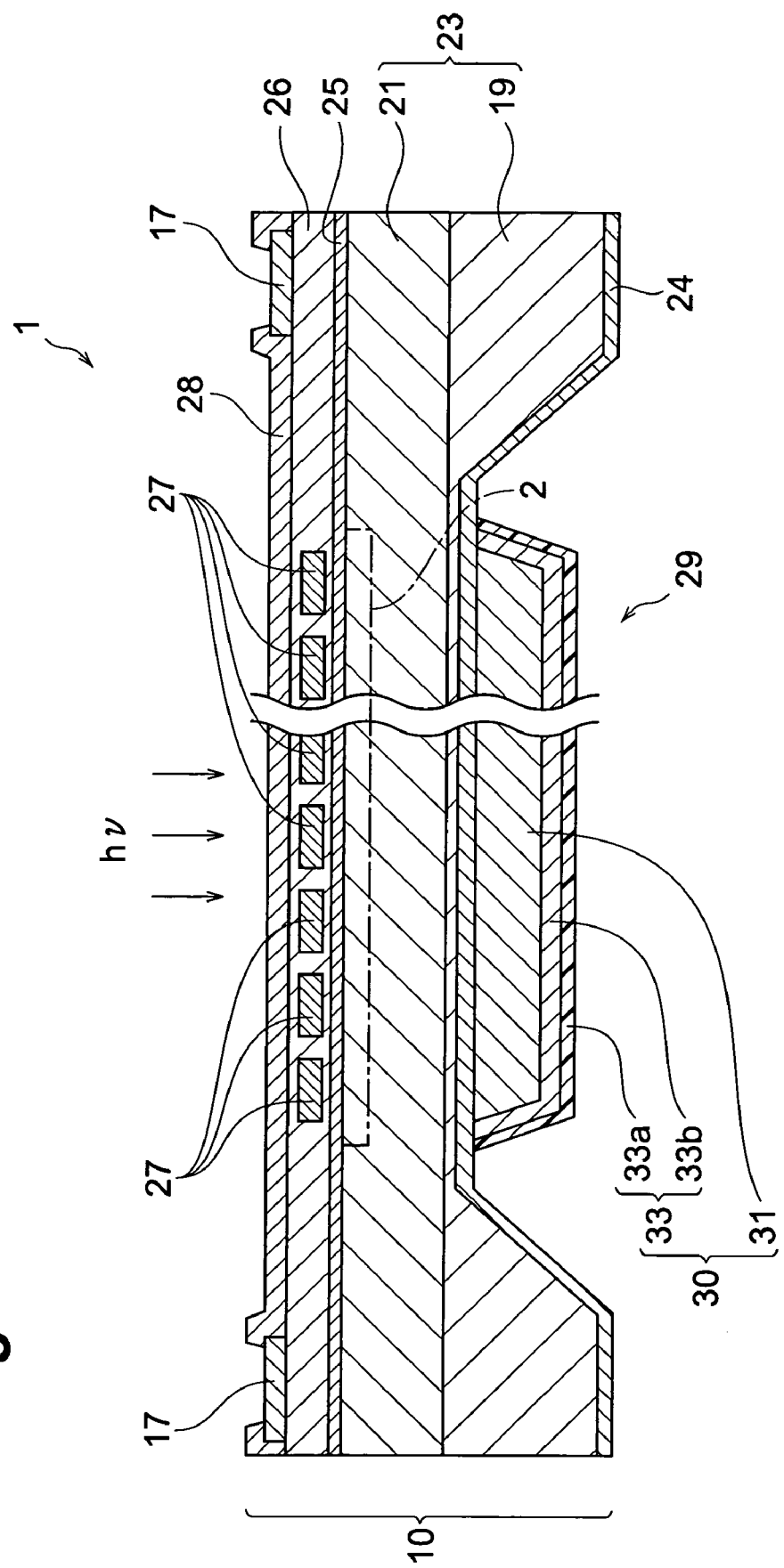
FIG. 1 is a schematic view illustrative of a sectional structure of an X-ray imaging device in accordance with a first embodiment.

The invention now will be described hereinafter with reference to the drawings in which X-ray imaging devices in accordance with the embodiments of the invention are shown. Note that, in the respective drawings, the same reference numerals will be used for the same elements or elements having the same functions, and repeated description will be omitted.

(First Embodiment)

FIG. 1 is a schematic depiction of a sectional structure of the X-ray imaging device in accordance with a first embodiment. In the description hereinafter, the front surface refers to the surface of X-ray incidence (that is, the upper surface in FIG. 1), and the rear surface refers to the opposite surface (that is, the lower surface in FIG. 1) to the front surface. The X-ray imaging device 1 is provided with a CCD portion 10 and a scintillation portion 30.

The CCD portion 10 has a semiconductor substrate 23. The semiconductor substrate 23 includes a high concentration $p^+$-type semiconductor layer 19 and a p-type epitaxial layer 21 deposited on $p^+$-type semiconductor layer 19. An insulating layer 25 is provided on the semiconductor substrate 23 (the p-type epitaxial layer 21). A plurality of transfer electrodes 27 made of polysilicon are provided in an insulating layer 26 on the insulating layer 25. An insulating layer 28 and electrode pads 17 (described below) are provided on the insulating layer 26. An imaging portion 2 described below is constituted by the area corresponding to a plurality of electrodes 27 at the semiconductor substrate 23 (the p-type epitaxial layer 21). The imaging portion 2 is arranged corresponding to a surface of X-ray incidence. A silicon oxide film 24 is formed on the rear surface of the semiconductor substrate 23.

The $p^+$-type semiconductor layer 19 is made of boron-doped silicon substrate and is about 300 $\mu$m in thickness. The p-type epitaxial layer 21 overlies the $p^+$-type semiconductor layer 19, has a high resistivity of several kΩcm and is about 50 to 100 $\mu$m in thickness. The insulating layer 25 is made of silicon oxide film and is about 0.1 $\mu$m in thickness. The insulating layer 26 is made of silicon oxide film, silicon nitride film or composite film thereof.

The area corresponding to the imaging portion 2 within the semiconductor substrate 23 (the $p^+$-type substrate layer 19) is thinned from the rear surface to form concave 29. The depth of the concave 29 is substantially equal to that of the $p^+$-type substrate layer 19, and the thinned area within the $p^+$-type semiconductor layer 19 functions as accumulation layer. The thickness of the thinned area within the $p^+$-type semiconductor layer 19 is approximately 1 $\mu$m.

Figure 2:
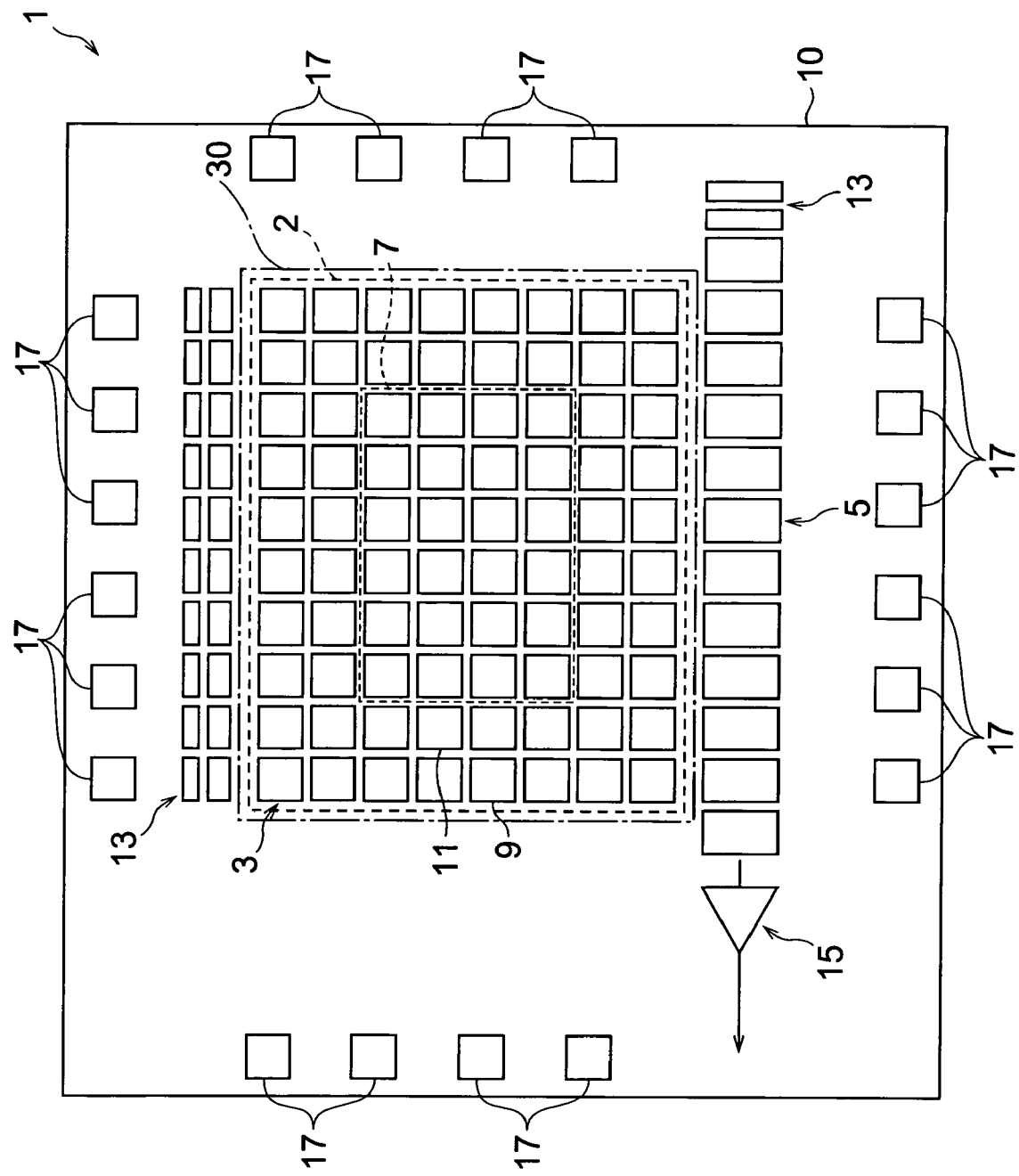
FIG. 2 is a schematic plan view of a CCD portion of the X-ray imaging device in accordance with the first embodiment.

The CCD portion 10 now will be discussed in detail hereinafter with reference to FIG. 2. FIG. 2 is a schematic plan view of the CCD portion within X-ray imaging device in accordance with the first embodiment. At the CCD portion 10, a full frame transfer (FFT) type CCD is constituted. The CCD portion 10 has a vertical shift register portion 3 corresponding to the imaging portion 2 and a horizontal shift register portion 5. The imaging portion 2 includes a photo detecting area 7, an optical black area 9 and an isolation area 11. At the ends of the CCD portion 10, a plurality of electrode pads 17 are provided.

The photo detecting area 7 is provided with a plurality of imaging elements (pixels) arranged two dimensionally. Each of the imaging elements is constituted by an area corresponding to each corresponding vertical shift register 3 of the p-type epitaxial layer 21. The imaging elements are adapted to have sensitivity to soft X-ray and to visual light with a wavelength range about 550 nm. This causes the imaging portion 2 to pick up images of soft X-ray and of visual light with the wavelength range.

The optical black area 9 is positioned outside the photo detecting area 7. In the optical black area 9, imaging elements configured for light not to be incident thereupon are arranged to surround the photo detecting area 7. Further, the isolation area 11 is interposed between the photo detecting area 7 and the optical black area 9 to electrically separate the photo detecting area 7 and the optical black area 9 from each other. The isolation area 11 and the optical black area 9 are used as reference for dark current or the like in the normal front illuminated CCD, but are not indispensable in the embodiment.

An input portion 13 inputs an electrical signal to the vertical shift register portion 3 and the horizontal shift register portion 5. The electrical charges stored in a potential well during integrating period are successively transferred during a charge transfer period via the vertical shift register portion 3 and the horizontal shift register portion 5 to become sequential signals. Transferred charges are converted into voltage at an output portion 15 to be output as image signals.

The vertical shift register portion 3, the horizontal shift register portion 5, the input portion 13 and the output portion 15 are electrically connected to each corresponding electrode pad 17 via patterned wirings (not shown). The electrode pads 17 serve to supply DC voltage and clock pulses to the CCD portion 10 (the vertical shift register portion 3, the horizontal shift register portion 5 or the input portion 13), and to output signals from the imaging portion 2. The electrical pads 17 are electrically connected to an external substrate by electrically connecting bonding wires (not shown).

The scintillation portion 30 now will be described hereinafter referring again to FIG. 1. The scintillation portion 30 is arranged to cover the area (the underside of the concave 29) corresponding to the imaging portion 2 on the rear surface of the semiconductor substrate 23. The scintillation portion 30 includes a scintillator 31 and a protective film 33. The scintillator 31 converts the incident soft X-ray into visible light within a wavelength range about 550 nm to which the imaging elements of the imaging portion 2 has sensitivity. The scintillator 31 is grown and formed on the rear surface (bottom portion of the concave 29) of the substrate corresponding to the imaging portion 2 and is made of CsI. The thickness of the scintillator 31 is about 100 to 500 μm. The scintillator 31 may be made by an adhesion or a deposition, with the protective film 33.

The rear surface of the scintillator 31 is coated with the protective film 33. The protective film 33 is constituted by a organic film 33a made of polyparaxylene and a reflective film 33b made of aluminum or the like laminated on each other. The organic film 33a prevents the scintillator 31 from being touched with air to avoid degradation of light emission efficiency due to deliquescence. The reflective thin film 33b reflects that part of the light generated at the scintillator 31 which proceeds in an opposite direction to X-ray incidence. Moreover, the reflective thin film 33b shields direct light from the outside. The thickness of the organic film 33a is about several μm to 10 and several μm. The thickness of the reflective film 33b is about 1 μm.

Figure 3A:
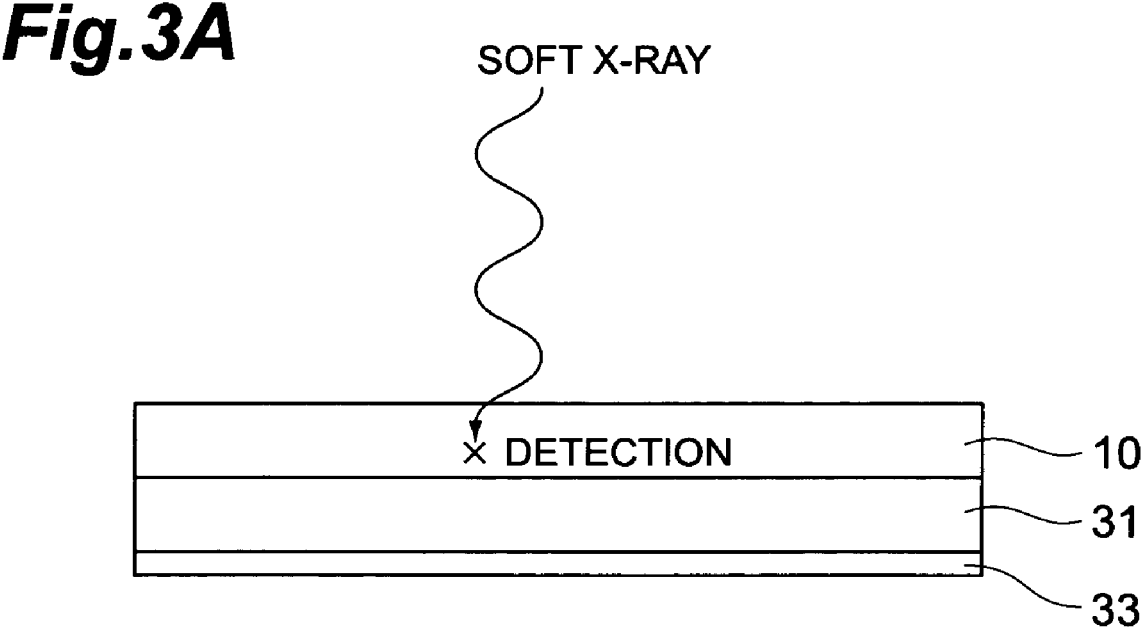
FIG. 3A is a depiction of the detection of soft X-ray at the X-ray imaging device in accordance with the first embodiment.

Operations of the X-ray imaging device 1 now will be hereinafter described. First, X-ray is incident from the front surface of the X-ray imaging device 1. If the incident X-ray is soft X-ray, since the imaging elements of the imaging portion 2 has sensitivity to soft X-ray, the incident soft X-ray generates electrons via photoelectric conversion within the depleted p-type epitaxial layer 21 of CCD portion 10. Electrons generated are stored in a potential well in the charge transfer channel formed below the insulating layer 25 during a predetermined time. This causes soft X-ray to be detected by the CCD portion 10 (see FIG. 3A). The number of electrons stored in each of the imaging elements is in proportion to the energy of the incident soft X-ray, and an image signal corresponding to the soft X-ray image is obtained.

Figure 3B:
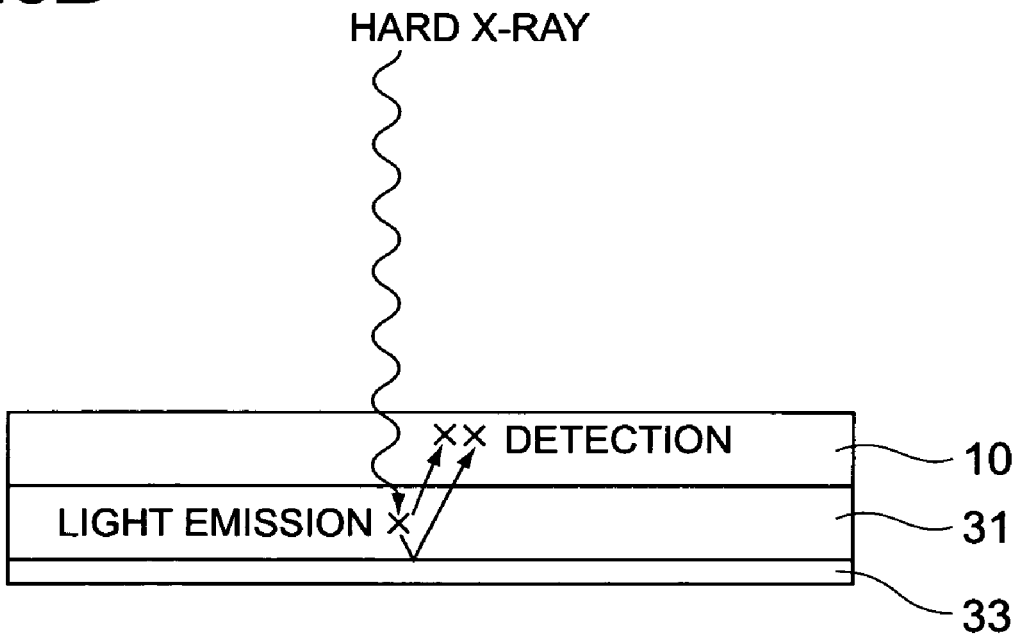
FIG. 3B is a depiction of the detection of hard X-ray at the X-ray imaging device in accordance with the first embodiment.

On the other hand, if the X-ray incident from the front surface of X-ray imaging device 1 is hard X-ray, since the imaging elements of the imaging portion 2 has no sensitivity to hard X-ray, the hard X-ray transmits through the CCD portion 10 (that is, the transfer electrodes 27, the insulating layers 25, 26 and 28, the semiconductor substrate 23 and a silicon oxide film 24) and reaches the scintillator 31 arranged on the rear surface (that is, the underside of the concave 29) of the thinned semiconductor substrate 23. The hard X-ray is absorbed at the scintillator 31, converted into visible light to which the imaging elements of the imaging portion 2 has sensitivity, and emitted in proportion to the dose of hard X-ray reaching the scintillator 31. That part of the emitted visible light which proceeds toward the front surface is incident upon the imaging elements of the imaging portion 2 from the rear surface (the underside of the concave 29) of the semiconductor substrate 23 (that is, the CCD portion 10 functions as the so-called the back-illuminated CCD). The light proceeding toward the rear surface is reflected at the reflective thin film 33b of the protective film 33, and is incident upon the imaging elements of the imaging portion 2 from the rear surface (the underside of the concave 29) of the semiconductor substrate 23 through the scintillator 31 (see FIG. 3B). This causes almost all of the light generated at the scintillator 31 to be incident upon the imaging portion 2.

Since the imaging elements have sensitivity to the emitted visible light, an electric signal corresponding to the intensity of this visible light is generated to be stored during a predetermined time. Since the intensity of this visible light corresponds to the dose of incident hard X-ray, the number of electrons stored in each of the imaging elements is in proportion to the dose of incident hard X-ray, and the image signal corresponding to the hard X-ray image is obtained.

The image signals stored in the imaging elements are output sequentially from the electrode pads 17 via signal lines (not shown) and transferred outside the CCD portion 10. By processing the image signals at the external processing device (not shown), X-ray image is obtained.

As described above, in the first embodiment, image of soft X-ray is directly picked up by the imaging portion 2 of the CCD portion 10 when soft X-ray is incident. On the other hand, when hard X-ray is incident, the hard X-ray is converted into visible light by the scintillator 31, and the image of the resultant visible light is picked up by the imaging portion 2. As a result, image of both soft X-ray and hard X-ray, that is, X-ray with a significantly wide energy range of 0.1 to 100 keV, can be efficiently picked up.

Further, in the first embodiment, the simple structure in which the imaging portion 2 is formed on the front side of the semiconductor substrate 23 and the scintillator 31 is formed on the rear side of the semiconductor substrate 23 so as to cover at least the area corresponding to the imaging portion 2, so that image of any X-ray with a wide energy range can be picked up.

Further, the first embodiment contemplates using the scintillator made of CsI as the scintillator 31. Since CsI constitutes columnar crystal, the scintillator 31 allows high resolution of X-ray incidence position. Further, since the scintillator 31 containing CsI allows a high intensity of light emission, the X-ray imaging device 1 using the scintillator 31 allows high energy resolution.

Further, in the first embodiment, the reflective thin film 33b is provided behind the scintillator 31 in a direction of X-ray incidence. Whereby, since part of the light generated at the scintillator 31 which proceeds in the opposite direction of X-ray incidence is reflected by the reflective thin film 33b, it is possible to improve detection sensitivity without missing the generated light.

Further, in the first embodiment, the area corresponding to the imaging portion 2 of the semiconductor substrate 23 (the $p^+$-type semiconductor layer 19) is thinned. Since the semiconductor substrate 23 (the $p^+$-type semiconductor layer 19) is thinned, the absorption of the light generated at the scintillator 31 through the semiconductor substrate 23 (the $p^+$-type semiconductor layer 19) is suppressed. As a result, the reduction of the detection sensitivity to the light generated at the scintillator 31 can be suppressed.

(Second Embodiment)

FIG. 4 is a schematic representation of a sectional structure of the X-ray imaging device in accordance with a second embodiment. Hereinafter, the surface of X-ray incidence (the lower surface in FIG. 4) refers to the rear surface, and the opposite surface (the upper surface in FIG. 4) to the surface of X-ray incidence refers to the front surface.

As shown in FIG. 4, an X-ray imaging device 51 is provided with the CCD portion 10 and the scintillation portion 30. The CCD portion 10 has the semiconductor substrate 23. The Semiconductor substrate 23 includes the $p^+$-type semiconductor layer 19 and the p-type epitaxial layer 21.

It is noted that the CCD portion 10 has the vertical shift register portion 3 and the horizontal shift register portion 5 as shown in FIG. 2. The imaging portion 2 includes the photo detecting area 7, the optical black area 9 and the isolation area 11.

The scintillation portion 30 is arranged on the insulating layer 28 so as to cover the imaging portion 2. The scintillation portion 30 includes the scintillator 31 and the protective film 33. The scintillator 31 is grown and formed on the front surface of the insulating layer 28 (the imaging portion 2) and is made of CsI. The front surface of the scintillator 31 is coated with the protective film 33. The scintillator 31 may be made by an adhesion or a deposition, with the protective film 33.

Figure 5A:
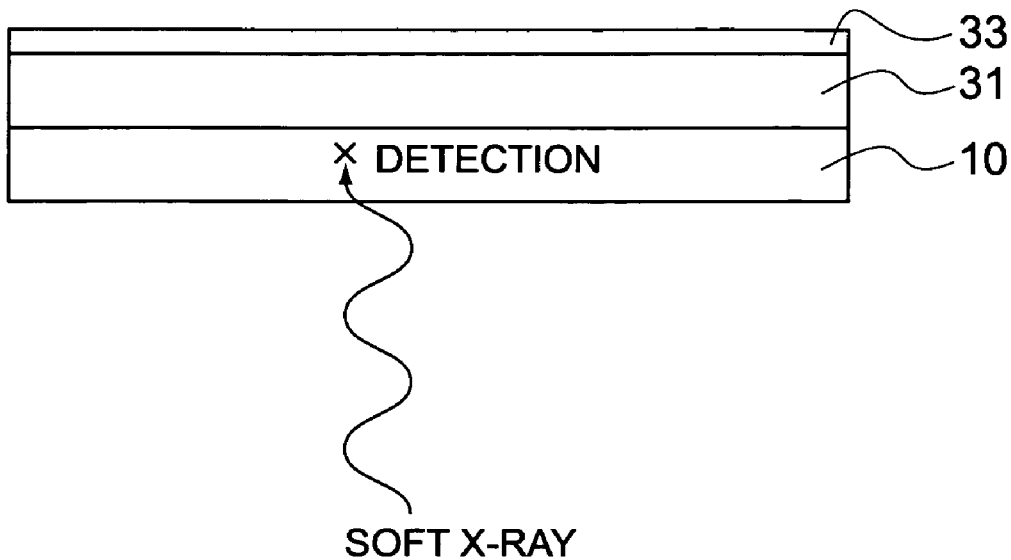
FIG. 5A is a depiction of the detection of soft X-ray at the X-ray imaging device in accordance with the second embodiment.

Operations of the X-ray imaging device 51 now-will be hereinafter described. First, X-ray is incident from the rear side of the X-ray imaging device 51. If the incident X-ray is soft X-ray, since the imaging elements of the imaging portion 2 have sensitivity to soft X-ray, the incident soft X-ray generates electrons via photoelectric conversion within the depleted p-type epitaxial layer 21 of the CCD portion 10. Generated electrons are stored in a potential well of the charge transfer channel formed below the insulating layer 25 during a predetermined time. This causes soft X-ray to be detected by the CCD portion 10 (see FIG. 5A). The number of electrons stored in each of the imaging elements is in proportion to the energy of the incident soft X-ray, and an image signal corresponding to the soft X-ray image is obtained.

Figure 5B:
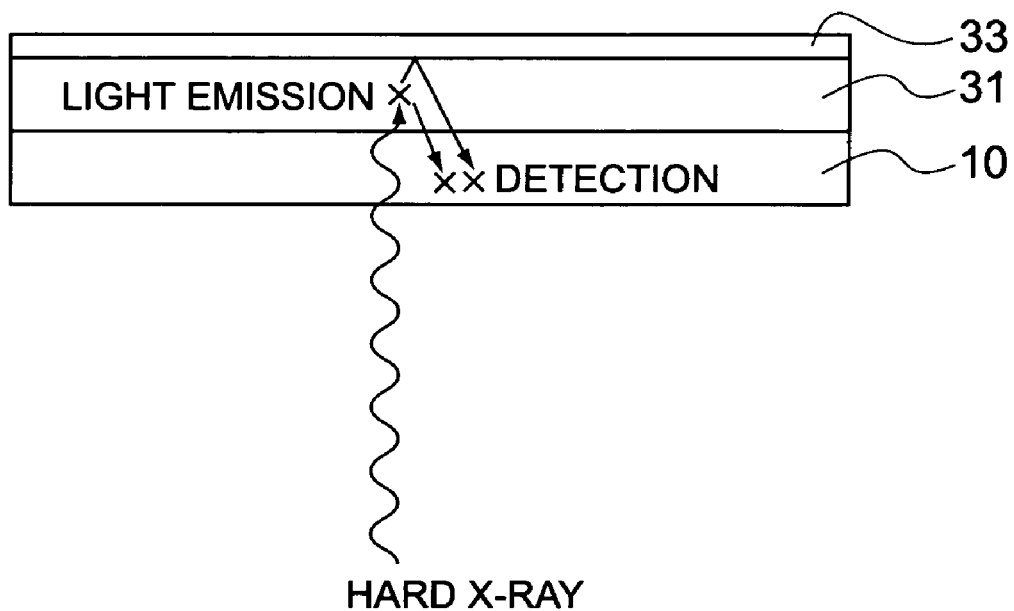
FIG. 5B is a depiction of the detection of hard X-ray at the X-ray imaging device in accordance with the second embodiment.

On the other hand, if the X-ray incident from the rear surface of the X-ray imaging device 51 is hard X-ray, since the imaging elements of the imaging portion 2 have no sensitivity to hard X-ray, the hard X-ray passes through the CCD portion 10 (the silicon oxide film 24, the semiconductor substrate 23, the insulating layers 25, 26 and 28 and the transfer electrodes 27) and reaches the scintillator 31 arranged on the front surface (the opposite surface to the concave 29) of the thinned semiconductor substrate 23. The hard X-ray is converted into visible light to which the imaging elements of the imaging portion 2 have sensitivity, and emitted in proportion to the dose of hard X-ray reaching the scintillator 31. That part of the emitted visible light which proceeds toward the rear side is incident upon the imaging elements of the imaging portion 2. The light proceeding toward the front surface is reflected by the reflective thin film 33b of the protective film 33, passes through the scintillator 31 and is incident upon the imaging elements of the imaging portion 2 (see FIG. 5B) This causes almost all of the light generated at the scintillator 31 to be incident upon the imaging portion 2.

Since the imaging elements have sensitivity to the emitted visible light, an electric signal corresponding to the intensity of this visible light is generated via photoelectric conversion to be stored during a predetermined time. Since the intensity of this visible light corresponds to the dose of the incident hard X-ray, the number of electrons stored in each of the imaging elements is in proportion to the dose of the incident hard X-ray, and an image signal corresponding to the hard X-ray image is obtained.

The image signals stored in the imaging elements are sequentially output from the electrode pads 17 via signal lines (not shown) and transferred outside the CCD portion 10. By processing the image signal at the external processing device (not shown), X-ray image is obtained.

As described above, in the second embodiment, as with the first embodiment, when soft X-ray is incident, image of the soft X-ray is directly picked up by the imaging portion 2 of the CCD portion 10. On the other hand, when hard X-ray is incident, the hard X-ray is converted into visible light by the scintillator 31, and the image of the resultant visible light is picked up by the imaging portion 2. As a result, images of both soft X-ray and hard X-ray, that is, any X-ray with a significantly wide energy range of 0.1 to 100 keV, can be efficiently picked up.

Further, in the second embodiment, through the simple structure wherein the imaging portion 2 is formed on the front side of the semiconductor substrate 23 and the scintillator 31 is arranged on the front side of the semiconductor substrate 23 so as to cover at least the imaging portion 2, image of any X-ray with a wide energy range can be picked up.

Further, in the X-ray imaging 51 of the second embodiment, X-ray is incident from the rear side of the semiconductor substrate 23. Hard X-ray that has high energy is incident from the rear side, passes through the transfer electrodes 27, causes the scintillator 31 to emit light and is detected as visible light emitted from the scintillator 31. On the other hand, soft X-ray that has low energy is hardly absorbed through the $p^+$-type semiconductor substrate 19, since the $p^+$-type semiconductor layer 19 is thinned. Further, since soft X-ray that has low energy is incident from the rear side not provided with the transfer electrodes 27, soft X-ray is not shielded by the transfer electrodes 27. This causes soft X-ray to be efficiently detected. As a result, images of soft X-ray and hard X-ray, that is, any X-ray with a wide energy range, can be efficiently picked up.

In the X-ray imaging devices 1 and 51 of the embodiment, the semiconductor substrate 23 is of p-type, which is to be considered as illustrative and not restrictive, and the semiconductor substrate 23 may be of n-type.

If the specific resistances of silicon wafers are made equal, the impurity concentration of n-type semiconductor can be lower than that of p-type semiconductor. Therefore, if applied voltages are approximately equal, the depletion layer in the n-type semiconductor substrate to be formed thick. Whereby, the semiconductor substrate is not necessary to be partially thinned, and the forming step for the concave on the rear side can be omitted.

Further, in the X-ray imaging devices 1 and 51 of the embodiment, the scintillator made of CsI is used as the scintillator 31, which is to be considered as illustrative and not restrictive, and the scintillator containing $Bi_4Ge_3O_{12}$ (called "BGO" hereinafter) (and possibly other substances wherein the content of BGO is preferably 95 to 100% by weight) may also be used. Since BGO constitutes, as with CsI, columnar crystal, the scintillator containing BGO allows high resolution of the X-ray incidence position. Further, since the scintillator containing BGO allows a high intensity of light emission, the X-ray imaging device 1 and 51 allows high energy resolution. It is noted that generally a case occurs often where the X-ray imaging device is cooled for use to suppress thermal noise. However, since especially BGO shows a high intensity of light emission even when being cooled to the temperature of about −100° C., the scintillator containing BGO allows a high intensity of light emission and high energy resolution, even when the X-ray imaging device 1 and 51 is being cooled.

The scintillator containing $Gd_2O_2S$ may be used as the scintillator 31. Since $Gd_2O_2S$ constitutes, as with CsI, columnar crystal, the scintillator containing $Gd_2O_2S$ allows high determination accuracy of the X-ray incidence position. Since the scintillator containing $Gd_2O_2S$ allows a high intensity of light emission, the X-ray imaging device using the scintillator containing $Gd_2O_2S$ allows a high energy resolution.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An X-ray imaging device, comprising:
   an imaging portion arranged corresponding to a surface of X-ray incidence, having sensitivity to X-ray with a predetermined energy range and to visible light with a predetermined wavelength range and picking up images of X-ray and visible light; and a scintillator arranged on an opposite surface to said surface of X-ray incidence across said imaging portion in a direction of X-ray incidence, emitting visible light with said predetermined wavelength range by absorbing X-ray with a higher energy range than said predetermined energy range.

2. The X-ray imaging device according to claim 1, wherein said imaging portion is formed on said opposite surface to said surface of X-ray incidence on a semiconductor substrate; and said scintillator is arranged on said opposite surface of said semiconductor substrate so as to cover at least said imaging portion.

3. The X-ray imaging device according to claim 2, wherein said semiconductor substrate is thinned at an area corresponding to said imaging portion.

4. The X-ray imaging device according to claim 1, wherein said imaging portion is formed on said surface of X-ray incidence on a semiconductor substrate; and said scintillator is arranged on said opposite surface to said surface of X-ray incidence on said semiconductor substrate so as to cover at least an area corresponding to said imaging portion.

5. The X-ray imaging device according to claim 4, wherein said semiconductor substrate is thinned at an area corresponding to said imaging portion.

6. The X-ray imaging device according to claim 1, wherein said imaging portion includes a plurality of imaging elements arrayed two-dimensionally.

7. The X-ray imaging device according to claim 1, wherein said scintillator contains $Bi_4Ge_3O_{12}$.

8. The X-ray imaging device according to claim 1, wherein said scintillator contains CsI.

9. The X-ray imaging device according to claim 1, wherein said scintillator contains $Gd_2O_2S$.

10. The X-ray imaging device according to claim 1, wherein a reflective film to reflect visible light with said predetermined wavelength range is provided behind said scintillator in the direction of X-ray incident.

11. An X-ray imaging device, comprising:

an imaging portion formed on an opposite surface to a surface of X-ray incidence on a semiconductor substrate, having sensitivity to X-ray with a predetermined energy range and to visible light with a predetermined wavelength range and picking up images of X-ray and visible light; and a scintillator arranged on the opposite surface of said semiconductor substrate so as to cover said imaging portion, emitting visible light with said predetermined wavelength range by absorbing X-ray with a higher energy range than said energy range.

12. An X-ray imaging device, comprising:

an imaging portion formed on a surface of X-ray incidence on a semiconductor substrate, having sensitivity to X-ray with a predetermined energy range and to visible light with a predetermined wavelength range and picking up images of said X-ray and said visible light; and a scintillator arranged on an opposite surface to said surface of X-ray incidence on said semiconductor substrate so as to cover at least an area corresponding to said imaging portion, emitting visible light with said predetermined wavelength range by absorbing X-ray with a higher energy range than said-predetermined energy range.

* * * * *